United States Patent [19]

Rittenhouse

[11] 4,028,501

[45] June 7, 1977

[54] METHOD AND APPARATUS FOR TRANSLATING MULTIPLE FREQUENCY SIGNALLING

[75] Inventor: Dennis Edwin Rittenhouse, Kanata, Canada

[73] Assignee: Northern Electric Company Limited, Montreal, Canada

[22] Filed: Mar. 4, 1976

[21] Appl. No.: 663,687

[52] U.S. Cl. .......................................... 179/84 VF
[51] Int. Cl.² ........................................ H04M 1/50
[58] Field of Search ............. 179/84 VF; 324/78 D; 328/138

[56] References Cited

UNITED STATES PATENTS

| | | | |
|---|---|---|---|
| 3,537,001 | 10/1970 | Friend | 179/84 VF |
| 3,790,720 | 2/1974 | Schartmann | 179/84 VF |
| 3,795,775 | 3/1974 | Cowpland | 179/84 VF |
| 3,914,557 | 10/1975 | O'Neill | 179/84 VF |

Primary Examiner—William C. Cooper
Assistant Examiner—Joseph Popek
Attorney, Agent, or Firm—Frank Turpin

[57] ABSTRACT

A multiple frequency signalling receiver translates combinations of tone signals received from a telephone set to derive binary two out of eight coded signalling. Received signals are directed by a filter to high and low band translator circuits. Each translator circuit includes a circuit for deriving a threshold signal from the received signal and a threshold signal controlled limiter for limiting the received signal. The threshold signals are cross coupled between the limiter in each translator to prevent response to signals in the high and low bands being substantially unbalanced in amplitude. Digital counting and decoding circuits in each translator circuit detect predetermined frequencies of signals from the limiting circuits. Upon occurrence of a consistent detection by both the translator circuits lasting for at least about 40 milliseconds, the appropriate two out of eight code is gated to the output terminals of the multifrequency receiver. Tolerance to subscriber loop noise is enhanced with the addition of latch timer circuits in series with the outputs of the decoder circuits, whereby short interruptions in the tone signals are ignored.

5 Claims, 2 Drawing Figures

METHOD AND APPARATUS FOR TRANSLATING MULTIPLE FREQUENCY SIGNALLING

The present invention relates to multiple frequency signalling receivers for receiving signalling information therefrom, and more particularly to multiple frequency signalling receivers which include digital frequency detection circuits.

In telephone systems, telephone subscriber dialled digits are often transmitted by combinations of tone signals. Each digit is represented by a combination of two tone signals, one selected from a high group of tones and the other selected from a lower group of tones. As these tone signals reside in the voice band, there is always a possibility that sounds received by the telephone microphone or crosstalk on a subscriber line can include signals having frequencies of one or more or the tones. A multiple frequency tone receiver must distinguish between valid tone signals, representative of signalling information, and invalid tone signals. Satisfactory analogue tone receivers have been developed, as for example described in Canadian Pat. No. 694,870 entitled "Multifrequency Signal Receiver" and issued to D. H. Nash and L. Schenker on Sept. 22, 1964. This receiver translates predetermined combinations of tone signals into direct current signals providing that signal parameters of frequency, minimum amplitude, and persistence through a preselected duration of time are met. More recently, tone receiver circuits based primarily on digital circuitry have been designed, as for example disclosed in Canadian Pat. No. 858,710 entitled "Multifrequency Tone Detector" issued to J. J. Friend on Dec. 15, 1970, and disclosed in Canadian Pat. No. 963,593, entitled "Digital Decoder for Multiple Frequency Telephone Signalling" issued to K. R. Schartmann on Feb. 25, 1975. Both of these circuits are manufacturable at a significant cost reduction as compared to the above-mentioned analogue tone receiver.

Analogue multiple frequency signalling receivers similar to that described by D. H. Nash and L. Schenker, have been used extensively in the North American telephone network to receive subscriber loop signalling. The length and quality of the subscriber loops, in comparison one with the other, varies considerably. Hence, in the past, a tone receiver has to be sensitive enough to accept and translate tone signals which exceeded a certain minimum level. This minimum level was chosen to be low enough to always accept valid tone signals, but this did not mean that this level was high enough to reject any invalid tone signals. In contrast, the loop circuits in key telephone systems and in many private branch exchanges, are much shorter than many of the subscriber loops in the general telephone network. These shorter loop circuits typically have more consistent transmission qualities. Hence signalling on these loop circuits is more easily distinguished from cross talk and other noise signals. In key telephone systems the use of digital circuitry multiple frequency tone receivers has been found to be quite satisfactory. However, in the general telephone network the use of digital circuitry such as described by K. R. Schartmannhas been found to produce unacceptably high error rates.

The present invention provides a multiple frequency signalling receiver, which includes digital circuitry frequency detectors. The receiver is a suitable replacement for analogue tone receivers and is substantially more economical to manufacture than the analogue tone receivers. Tone signals are received from a subscriber loop by the multiple frequency signalling receiver and filtered into high and lower bands. The signals in the high and lower bands are utilized to derive high band and low band threshold levels. The threshold levels are cross coupled so that signals in each band having an amplitude greater than the threshold level of the opposite band are passed to a digital detector. Signals of an amplitude less than the threshold level of the opposite band are inhibited. An output circuit receives the outputs of the digital detectors and gates the signalling information to the output of the multiple frequency signalling receiver in the event of simultaneous frequency detection persisting over a preselected period of time.

The present invention also provides a method for receiving multiple frequency signalling. Voice frequency signals are received and filtered into high and low bands. The signals in the high and low bands are used to derive high band and low band threshold levels respectively. The signals in each band having amplitudes exceeding the threshold levels in the other band are limited and the signals of lesser amplitudes are inhibited. In each band the frequency of the limited signals is digitally detected. An output signal, indicative of the frequencies detected, is generated solely in response to a substantially simultaneous and constant frequency detection in both bands extending over a preselected period of time. Signalling information is thereby translated from tone signals co-existing in any one of a plurality of predetermined frequency combinations for at least the preselected period of time and having substantially similar amplitudes. On the other hand signals not meeting these requirements are invalid for signalling and translation of these invalid signals is substantially avoided.

Tolerance to loop noise and transient signals is improved with the addition of latch timer circuits between each digital frequency detector and the output circuit. Each latch timer responds immediately to a frequency detection and responds to the cessation of frequency detection only after a predetermined period of time. Thus, when a few cycles of the tone signal are interrupted by a loop transient condition the tone receiver ignores the interruption if the frequency detection is restored within the predetermined period of time.

An example embodiment of the invention is described in conjunction with the accompanying drawings in which.

Figure 1:
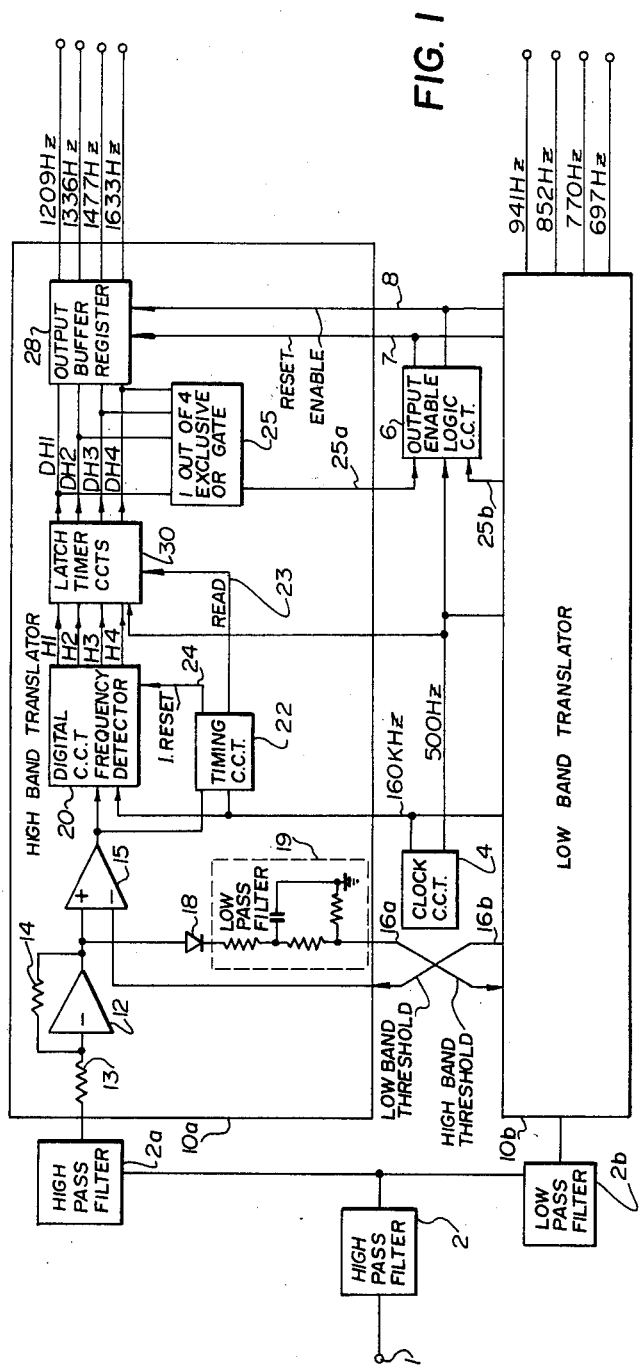
FIG. 1 is a schematic block diagram of a multiple frequency signalling receiver.

Referring to FIG. 1, the multiple frequency signalling receiver includes a high band translator 10a and a low translator 10b. The high band translator 10a receives signals from a high pass filter 2a, and the low band translator 10b receives signals from a low pass filter 2b. A high pass filter 2 is connected in series between an input terminal 1 and the filters 2a and 2b. The high filter 2 prevents any substantial amount of lower frequency signals from being received, for example dial tone, power line hum and ringing signals. The high pass filter 2a has a cut off frequency just below that of the lowest frequency to be detected by the high band translator 10a. Likewise the low pass filter 2b has a cut off frequency just above that of the highest frequency to be detected by the low band translator 10b. A clock circuit 4 supplies 160 KHz and 500 Hz symmetrical square wave clock signals to the high low band translators. An output enable logic circuit 6 utilizes the 500 Hz clock signal and logic signals from the high and low band translators supplied via leads 25a and 25b to generate reset and enable signals on leads 7 and 8 respectively. The function of each of these circuit elements will become more evident in the following description of the high band translator 10a.

The high band translator 10a and the low band translator 10b are substantially identical and hence only the high band translator 10a will be described in detail. Signals received from the high pass filter 2a are connected to an inverting amplifier 12 via a resistor 13. A resistor 14 is connected between the output and the input of the amplifier 12 and in combination with the resistor 13 determines the gain of the amplifier 12, in a well known manner. The output of the amplifier 12 is connected to the non-inverting input of a differential amplifier 15 and to the anode electrode of a diode 18. The cathode electrode of the diode 18 is connected to a low pass filter 19. The combination of the diode 18 and the low pass filter 19 derive a unidirectional high band threshold signal proportional to the signal at the output of the amplifier 12. The high band threshold signal is connected from the output of the filter 19 to the band translator via a lead 16a. Likewise, a low band threshold signal is derived by similar circuitry in the low band translator 10b and is connected to the inverting input of the differential amplifier 15 in the high band translator 10a, via a lead 16b. Signals at the non-inverting input of the amplifier 15 which have an amplitude exceeding the low band threshold signal overdrive the amplifier 15 to produce limited signals. These limited signals are connected from the output of the amplifier 15 to a gating input of a digital circuitry frequency detector 20 and to an input of a timing circuit 22. The 160 KHz clock signal output of the clock circuit 4 is connected to a counting input of the detector 20 and to another input of the timing circuit 22. The timing circuit 22 generates a read signal coincident with the first half period of the first 160 KHz square wave clock signal following a low-high transition of the limited signal and provides the read signal on a read lead 23. In the second half period of the clock signal a reset signal is supplied from the timing circuit 22 to the detector 20 via a reset lead 24. The detector 20 includes a binary counter, not shown, which counts the 160 KHz clock signals occurring between the reset signals from the timing circuit 22 to derive a measure of the period of each cycle in the received frequency. A decoder, also not shown, in the detector 20 is arranged to indicate on one of output leads H1–H4 when a count corresponding to the period, plus or minus a few percent, of one of four high band frequencies occurs. The decoder in the detector 20 also decodes a count overrun which controls an input gate in the detector 20 to inhibit further counting until after reset signal is generated by the timing circuit 22. This prevents any chance occurrences of the counter overshooting through a zero count and giving false indication. Four latch timer circuits 30 each have an input connected to one one of the leads H1–H4 and an output connected to one of leads DH1–DH4 respectively. The occurrence of the read signal on the lead 23 causes each latch timer circuit 30 to effectively assume the state of its input lead H. In the case where the detector 20 indicates a detected frequency on one of the leads H1–H4 coincident with the read signal on the read lead 23, the associated one of latch timer circuits 30 passes this indication from the H lead to the corresponding DH lead and maintains this indication for 2 to 3 milliseconds after the last occurring indication. In the low band translator 10b a similar latch timer circuit maintains a detection indication for a period of from 4 to 6 milliseconds after the last indication. The latch timer circuit 30 prevents interruption of a detection of one of the leads DH1–DH4 which might otherwise occur for example as a result of impulse noise on a subscriber loop. The leads DH1–DH4 are connected from the outputs of the latch timer circuit 30 to the inputs of an output buffer register 28 and to the inputs of one out of four exclusive OR gate circuit 25. The output of the exclusive OR gate circuit 25 is connected to the output enable logic circuit 6 via the lead 25a and provides an indication to the logic circuit 6 when no more and no less than one of the leads DH1–DH4 carries a detection indication. Likewise, an indication is received by the logic circuit 6 from the low band translator 10b via the lead 25b. The logic circuit 6 utilizes the 500 Hz clock signal to generate an enable signal on the enable lead 8, after uninterrupted indications on both the leads 25a and 25b have been present for at least a preselected period of time. In the North American telephone system, the enable signal is generated about 40 milliseconds after the receiver begins to receive valid signalling signals. The enable signal causes the register circuit 28 to store the states of the lead DH1–DH4 and to provide these stored states at its corresponding output terminals. These output terminals are labelled in FIG. 1 with the standard North American telephone system subscriber signalling frequencies. In the high band these frequencies are 1209, 1336, 1477 and 1633 Hz, and in the low band these frequencies are 697, 770, 852 to 941 Hz. After a predetermined period of time the logic circuit 6 generates a reset signal which is received by the register 28 via the reset lead 7. The reset signal causes the stored state to be erased from the register 28 and thus terminates the indications at the output terminals. The logic circuit 6 is able to generate another enable signal only after there is an interruption in the indication on one of the leads 25a or 25b. Thus the multifrequency receiver operates to translate each occurrence of a valid tone signal combination received for a duration of at least about 40 milliseconds.

Signalling frequencies received from any given subscriber loop are of similar tone signal amplitudes. This is inherently so, as the upper and lower band tone signals are generated with very similar amplitudes in the subscriber telephone set. In transmission over the subscriber loop to the central office both signals are subject to the noise and attenuation of the loop. This similarity of signal amplitudes is taken advantage of, as previously described, by deriving the upper and lower band threshold signals which are cross-coupled to the respective differential limiting amplifiers 15 in the high band and low band translators 10a and 10b. The threshold levels should be closely proportional to the received signal levels, particularly near or at the lower levels of valid tone signal amplitudes. Otherwise the advantage provided by the cross-coupled threshold levels will be degraded when it is most needed. Hence, in this embodiment, it is preferable that the diode 18 have a low forward voltage drop, at least as low as that of a germanium diode or a silicon Schottky barrier diode. Alternately a low forward voltage drop characteristic can be effectively simulated by using a PN junction silicon diode in combination with an amplifier. In the illustrated embodiment, this arrangement has been found to provide sufficient protection against invalid signalling and yet be tolerant enough to accept virtually all valid signalling when the threshold level is about one quarter of the peak voltage of the tone signal from which the threshold voltage is generated. This restricts the permissible imbalance between signals received by high and low band translators 10a and 10b to no more than about 6db. A greater imbalance prevents the weaker of the two signals from being passed to a detector 20. In the case where only one of the translators 10a or 10b detects a frequency, the output enable logic circuit 6 determines that the detection is invalid and inhibits any output indication.

Figure 2:
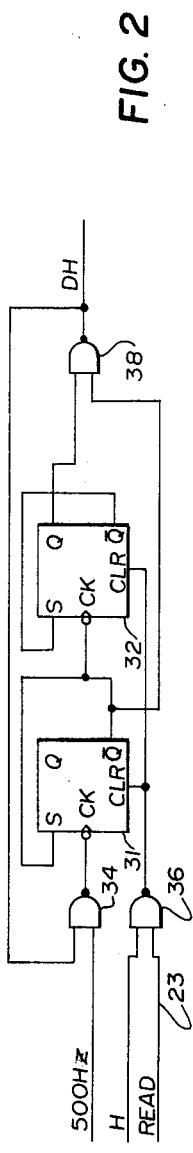
FIG. 2 is a schematic diagram of one part of the multiple frequency signalling receiver shown in FIG. 1.

The circuit shown in FIG. 2 is one example of a suitable latch timer circuit and includes a counter and associated NAND gates. Other circuits for providing the latch timer circuit function, for example a retriggerable one shot, may be substituted for the illustrated circuit. The latch timer circuit in FIG. 2 includes two master slave flip-flops 31 and 32 connected to provide a counter function and three NAND gates 34, 36 and 38. The flip-flops each have a set input S, a clock input CK, a clear or reset input CLR and complementary outputs Q and $\overline{Q}$. In the high band translator the inputs of the NAND gate 38 are connected to the output $\overline{Q}$ of the flip-flop 31 and to the output Q of the flip-flop 32 to decode a count of three to yield, in positive logic, a low on the output lead DH, the output lead DH being one of the leads DH1–DH4 in FIG. 1. The latch timer circuits for the low band translator differ in that the output Q of both flip-flops 31 and 32 are connected to the inputs of the NAND gate 38.

In operation the flip flops 31 and 32 act as a counter which is being continually reset by a frequency detection signal appearing on the lead H. Only when the counter reaches a count of 3 for the high band translator or a count of 4 for the low band translator does the output of the NAND gate 38 go LOW indicating no detection. In more detail, a read signal on the lead 23 causes the state of the lead H inverted by the NAND gate 36 to be applied to the CLR inputs of the flip-flops 31 and 32. When the state of the lead H indicates a frequency has been detected, the flip-flops are reset. The 500 Hz signal is applied inverted via the NAND gate 34 to the CK input of the flip-flop 31. The rising edge of the 500 Hz signal causes the state of the $\overline{Q}$ output to be assumed at the S input and the falling edge of the 500 Hz signal then causes the Q output of the flip-flop to assume the S input state. The flip-flop 32 functions in like manner in response to the signals from the $\overline{Q}$ output of the flip-flop 31 applied at the CK input of the flip-flop 32. If the flip-flops are not reset, the circuit continues to count the 500 Hz signal until a count of 3 is reached. At this time the output $\overline{Q}$ of the flip-flop 31 and the output Q of the flip-flop 32 are both high. The output of the NAND gate 38 goes low and so prevents clock signals from reaching th flip-flop 31. Thus there is no indication of signal detection at the output of the latch timer circuit until a reset signal is eventually reapplied to the CLR inputs of the flip-flops 31 and 32.

What is claimed is:

1. A multiple frequency signalling receiver, for translating predetermined combinations of tone signals to derive signalling information therefrom, the receiver comprising:
   input means for receiving voice frequency signals;
   filter means, connected to the input means, for filtering the received signals into separate high and low bands;
   means, connected to the filter means, for generating high band and low band threshold levels in response to the amplitudes of signals in the high and low bands respectively;
   a high band detector including a high band digital circuit means for detecting ones of predetermined frequencies of the signals in the high band and for indicating the frequency detected;
   first means connected between the high band digital circuit means and the filter means, the first means being responsive to the low band threshold level to transmit, to the high band digital circuit, only those signals in the high band which exceed the low band threshold level;
   a low band detector including a low band digital circuit means for detecting ones of predetermined frequencies of the signals in the low band and for indicating the frequency detected;
   second means connected between the low band digital circuit means and the filter means, the second means being responsive to the high band threshold level to transmit, to the low band digital circuit, only those signals in the low band which exceed the high band threshold level;
   output means for indicating the frequencies detected by the detectors in response to a substantially simultaneous and constant indication of frequency detection from both detectors extending over a predetermined period of time.

2. A multiple frequency signalling receiver as defined in claim 1 in which the means for generating the threshold levels comprises:
   high band and low band rectifier circuits, connected to the filter means, for rectifying the signals in the high and low bands respectively, each rectifier circuit having an output;
   a first low pass filter attenuator network connected between the output of the high band rectifier circuit and the second means, for supplying the high band threshold level to said second means;
   a second low pass filter attenuator network, connected between the output of the low band rectifier circuit and the first means, for supplying the low band threshold level to said first means.

3. A multiple frequency signalling receiver as defined in claim 1 in which each of said first and second means comprises a differential amplifier having a non-inverting input for receiving signals in one of the bands, an inverting input for receiving the threshold level from the opposite band and an output connected to the input of its associated digital circuit detecting means.

4. A multiple frequency signalling receiver as defined in claim 1, further comprising:
   third means connected between the high band detector and the output means, and fourth means connected between the low band detector and the output means, the third and fourth means for prolonging the respective indications for the high and low band detectors of first and second predetermined periods of time, the second period of time being greater than the first period of time.

5. A method for translating predetermined combinations of tone signals to derive signalling information therefrom, comprising the steps of:
   a. receiving voice frequency signals and filtering the signals into high band and low band;
   b. rectifying the high band signals and the low band signals;
   c. filtering and attenuating the rectified high band and low band signals to derive a high band threshold level and a low band threshold level, respectively;
   d. in each band, limiting those signals which have an amplitude exceeding the threshold level derived in the other band and substantially inhibiting those signals having an amplitude of less than said threshold level;
   e. in each band, digitally detecting the frequency of the limited signal;
   f. generating an output signal indicative of the frequenices detected solely in response to a substantially simultaneous and constant frequency detection in both bands extending over a preselected period of time;
   whereby signalling information is translated from tone signals co-existing in any one of a plurality of predetermined frequency combinations for at least said preselected period of time and having substantially similar amplitudes, and translation of signals invalid for signalling is substantially avoided.

* * * * *